United States Patent [19]

Mancinelli

[11] Patent Number: 5,225,470
[45] Date of Patent: * Jul. 6, 1993

[54] ACRYLIC HOT MELT PRESSURE SENSITIVE ADHESIVE COMPOSITIONS

[75] Inventor: Paul A. Mancinelli, Frazer, Pa.

[73] Assignee: Monssanto Company, St. Louis, Mo.

[*] Notice: The portion of the term of this patent subsequent to Apr. 9, 2008 has been disclaimed.

[21] Appl. No.: 659,441

[22] Filed: Feb. 22, 1991

Related U.S. Application Data

[63] Continuation of Ser. No. 332,262, Mar. 31, 1989, Pat. No. 5,006,582, which is a continuation-in-part of Ser. No. 226,993, Aug. 1, 1988, abandoned.

[51] Int. Cl.⁵ .................... C08L 33/08; C08L 93/04; C08L 25/02; C08K 5/11
[52] U.S. Cl. .................. 524/271; 524/274; 524/285; 524/287; 524/210; 524/211; 524/241; 428/230; 428/243; 428/245
[58] Field of Search ............... 524/271, 274, 285, 287; 525/210, 211, 241; 428/230, 243, 245

[56] References Cited

U.S. PATENT DOCUMENTS

| | | | |
|---|---|---|---|
| 4,554,324 | 11/1985 | Husman et al. | 525/309 |
| 4,656,213 | 4/1987 | Schlademan | 524/272 |
| 5,006,582 | 4/1991 | Mancinelli | 524/271 |

OTHER PUBLICATIONS

Derwent Abstract 88-040475[06] (1988).
Derwent Abstract 87-127147[18] (1987).
Derwent Abstract 87-040280[06] (1987).
Goodyear Tech Book Facts-Wingtack WT-3-Wingtack 10 Liquid Tackifying Resin-Date unknown.
Arakawa Tech Data-Akron-Ark-047 (Date unknown).
Arakaw Technical Data-KE-311 Specially Modified Rosin Ester (Date unknown).
Product Data, No. 7369-Regalrez Hydrocarbon Resins (Date unknown).
Product Data, No. 7205-9 Foral 105 Synthetic Resin (Date unknown).
Product Bulletin-Super Sta-Tac 100 Hydrocarbon Resin 47-411 (Reichhold Resin & Binders Division)--Date unknown.

*Primary Examiner*—Thurman K. Page
*Assistant Examiner*—Carlos Azpuru

[57] ABSTRACT

Acrylic hot melt pressure sensitive adhesive compositions having a good balance of tack, peel and creep resistance at ambient temperature combined with optical clarity and desirable melt viscosity at elevated temperatures are prepared by copolymerizing acrylic and methacrylic alkyl esters of a non-tertiary alcohol or optionally acids with polymerizable poly methacrylate based macromonomers. The resulting acrylic copolymer has a graft or comb structure in which the acrylic backbone has a low Tg and the pendant macromonomer side chains have a Tg above room temperature. Compounding those acrylic copolymers with tackifiers and plasticizers dramatically improves the balance of pressure sensitive adhesive properties while lowering melt viscosity into a desirable range. The invention provides significant property enhancements even for acrylic copolymers having poor initial peel and shear adhesive properties. Preferably, the acrylic backbone is tailored by judicious selection of acrylic comonomers to allow compounding with several high performance hydrogenated tackifiers and plasticizers that provide water white and clear adhesive formulations while ensuring long term color stability, weatherability and general durability.

18 Claims, 1 Drawing Sheet

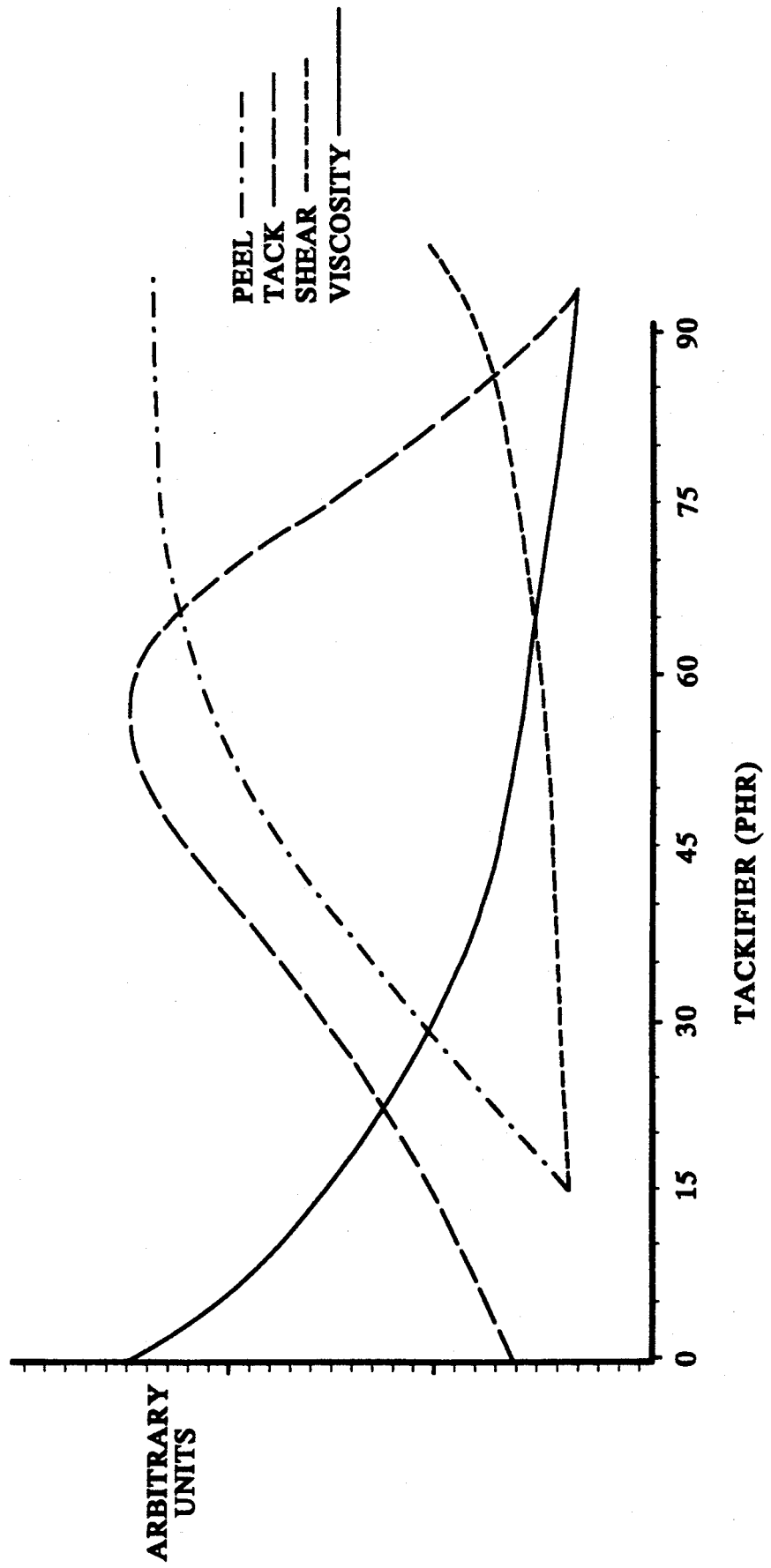
FIGURE

ACRYLIC HOT MELT PRESSURE SENSITIVE ADHESIVE COMPOSITIONS

CROSS-REFERENCE TO RELATED APPLICATION

This is a continuation of application Ser. No. 07/332,262, filed Mar. 31, 1989 now U.S. Pat. No. 5,006,582 which is a Continuation-in-Part of copending U.S. patent application Ser. No. 07/226,993, filed Aug. 1, 1988 now abandoned.

BACKGROUND OF THE INVENTION

Acrylic pressure sensitive adhesives (PSAs) have emerged as the product of choice in a variety of end-use applications where color, clarity, permanency, weatherability, versatility of adhesion, or the chemical characteristics of an all acrylic polymer is required. These applications include a variety of consumer, packaging, industrial and health care tapes, paper and film labels, decals, fleet markings/bumper stickers, and the like.

Acrylic PSAs have traditionally been prepared in and subsequently coated from an assortment of hydrocarbon solvents. Aqueous emulsion acrylics have been recognized in recent years as an environmentally safe alternative to solvent-born systems.

Product evolution of acrylic PSA technology has been toward higher solids and a 100% solids hot melt system. Elimination of the carrier has several economic benefits to the adhesive converter including lower energy and conversion costs, increased line speeds and production rates, as well as eliminating any adverse effects of organic solvents.

Given the desirable characteristics of hot melt technology, there has been ongoing interest in developing acrylic hot melt PSAs having the requisite four fold balance of adhesion, cohesion, strechiness and elasticity. The desire to maintain this balance of properties makes it extremely difficult to improve cohesive or internal strength without compromising processability or even the overall pressure sensitivity of the entire system. With acrylic adhesives, long term color stability, weatherability and durability are also important product characteristics.

Early attempts to produce acrylic hot melt pressure sensitive adhesives involved blends of polyacrylates and polymethacrylates having carefully selected compatibility characteristics. These initial blends were found to have a limited service temperature and deficiencies in cohesive strength. Bartman, in U.S. Pat. No. 4,360,638 and U.S. Pat. No. 4,423,182 discloses an ionomeric acrylic hot melt PSA system comprising a polymer containing carboxylic acid, a miscible metal salt, and an o-methoxy-substituted aryl acid. While significant improvements in cohesive properties were reported for the acrylic ionomers two problems existed in controlling the ionomeric interactions at processing temperatures, resulting in unstable melt viscosities and limited commercial utility.

Until recently, prior art relating to acrylic graft or comb polymers was restricted to non-pressure sensitive adhesive end-uses. The preparation of styrenic based macromonomers and their copolymerization with acrylates is described by Milkovich et al. in U.S. Pat. No. 3,786,116. That patent teaches the use of this technology for acrylic thermoplastic rubber applications and not acrylic pressure sensitive adhesives requiring the four fold balance of properties. Schlademan, U.S. Pat. No. 4,551,388, Husman et al, U.S. Pat. No. 4,554,324 and European patent application Ser. No. 104,046 discuss the use of macromonomers with acrylic comonomers in acrylic hot melt pressure sensitive adhesive compositions. While the Schlademen patent focused on the use of styrenic macromonomers, the Husman patent extended the concept to include acrylic PSA compositions based on poly (methyl methacrylate) macromonomers. Schlademan, in U.S. Pat. No. 4,656,213, disclosed that compounding acrylic graft copolymers improves properties but indicated it was essential to have styrenic pendant macromonomer side chains. In addition, only partially hydrogenated rosin ester tackifiers having yellow color were illustrated which would compromise water white color, weatherability and durability features normally associated with high performance acrylic pressure sensitive adhesives.

Finally, since styrenic polymers are known to undergo UV degradation, the macromonomer side chain may also contribute to a deterioration of properties in applications requiring long term outdoor exposure.

Sunagawa et al in Kokai Pat. No. 56[1981]-59882 discloses the preparation and use of acrylic graft copolymers as pressure sensitive adhesives whereas the graft copolymer is synthesized by reacting functional groups along a low Tg main acrylic copolymer with functional groups along a modifying copolymer of higher Tg. However the resulting acrylic graft copolymers were not identified as hot melt candidates nor was it disclosed that compounding improved the balance of pressure sensitive adhesive properties.

SUMMARY OF THE INVENTION

The present application relates to acrylic hot melt pressure sensitive adhesive compositions having a good balance of tack, peel and creep resistance at ambient temperature combined with optical clarity and desirable melt viscosity at elevated temperatures.

Specifically, the present invention provides an acrylic hot melt pressure sensitive adhesive composition comprising (a) about from 30 to 90% by weight of a thermoplastic comb copolymer of (i) 2–35% by weight, based on the thermoplastic copolymer, of a macromonomer of the general formula X-(Y)n-Z wherein X is a reactive end group capable of copolymerization under free radical conditions with acrylic comonomers to afford the comb copolymer having pendant macromonomer side chains along an acrylic backbone; Y is a linking group in which n is zero or one; and Z is a poly(methacrylate) based polymeric moiety having a $T_g$ greater than 20° C. and a weight average molecular weight of about from 2,000 to 35,000 and being substantially unreactive under copolymerization conditions; and (ii) 65 to 98% by weight, based on the thermoplastic copolymer, of one or more monomers selected from the group consisting of monomeric acrylic or methacrylic acid ester of a non-tertiary alcohol, the alcohol having from 1 to 18 carbon atoms;

(b) about from 10 to 70% by weight of tackifier; and (c) up to about 20% by weight of plasticizer.

Optionally, methacrylic acid, acrylic acid, acrylamide, methacrylamide, glycidal methacrylate, hydroxyethyl acrylate can be used in combination with the monomeric acrylic or methacrylic acid esters specified in (ii) above in the preparation of the backbone of the comb polymer.

The present invention further provides sheet materials coated with these adhesive compositions.

BRIEF DESCRIPTION OF THE DRAWING

The FIGURE is a graphical representation of the properties of adhesive compositions of the present invention.

DETAILED DESCRIPTION OF THE INVENTION

The hot melt pressure sensitive adhesive compositions of the present invention comprise, as indicated above, an acrylic thermoplastic graft or comb copolymer, a tackifier or modifier resin, and an optional plasticizing component.

The acrylic comb copolymers which can be used in the present invention can be prepared by the general processes shown in Milkovich et al., U.S. Pat. Nos. 3,786,116 and 4,554,324, both hereby incorporated by reference. In the processes there disclosed, a macromonomer is first prepared, and then copolymerized using a free radical process with one or more monomers selected from the group consisting of alkyl acrylates and methacrylates, where the alkyl groups may contain from 1-18 carbon atoms and optionally acrylic acid, acrylamide, and the like.

The macromonomer can be prepared directly from a methacrylate monomer and optionally other, non-styrenic comonomers polymerizable by free-radical initiators in the presence of a cobalt chain transfer agent to immediately afford a vinyl terminal group as taught in U.S. Pat. Nos. 4,694,054 and 4,680,352, hereby incorporated by reference.

Alternatively, the macromonomer can be prepared without the cobalt chain transfer agent and with or without conventional chain transfer agents to obtain a polymer having a functional end-group. This end-group can subsequently be reacted with an appropriate vinyl containing reagent using standard condensation chemistry to afford the required vinyl terminal group.

Preferred monomers for macromonomer synthesis by free-radical polymerization include one of the methacrylate monomers such as methyl methacrylate, ethyl methacrylate, cyclohexyl methacrylate, isobornyl methacrylate, methacrylic acid, glycidal methacrylate. Optional non-styrenic monomers suitable as comonomers include methyl acrylate, ethyl acrylate, acrylic acid, N-phenyl maleimide, acrylonitrile etc.

The macromonomer can be also be prepared from a methacrylate monomers polymerizable by a group transfer process taught in U.S. Pat. Nos. 4,414,372 and 4,417,034, hereby incorporated by reference. In this synthetic procedure, a group transfer initiator containing a blocked functional group can be used to initially prepare the methacrylate polymer. Following polymer synthesis, the protecting group is removed to provide a functional end group capable of further reaction with an appropriate vinyl containing reagent to afford a vinyl terminal group.

Alternatively, the macromonomer can also be prepared by an anionic process involving the initial formation of a living methacrylate polymer having a reactive terminal carbanion. For methacrylate monomers, this is usually carried out using an alkyl lithium initiator at low temperatures, for example, −78° C., to prevent side reactions. The carbanion is usually selectively capped with a reagent such as ethylene oxide prior to final termination or capping. A vinyl containing reagent such as methacryoyl chloride is preferably used to afford a methacrylate terminal group, although other capping reagent can be used. Vinyl lithium initiators can also be used instead of alkyl lithium initiators to provide a vinyl terminal group at the end of a poly methacrylate chain in a single step process.

Preferred monomers for macromonomer synthesis by group transfer or anionic techniques include a methacrylate monomer such as methyl methacrylate cyclohexyl methacrylate, ethyl methacrylate and isobornyl methacrylate. In the event that it is desired to introduce a polar moiety into the macromonomer chain, this can be accomplished by polymerizing a methacrylate monomer having a blocked functional group, and subsequently deblocking to provide the polar moiety along the macromonomer chain.

Regardless of the process, macromonomer should have a Tg of about from 25° to 175° C. and be incompatible with the acrylic backbone of the comb polymer.

Macromonomers which are particularly preferred for use in the present invention are made by polymerizing methyl methacrylate by a group transfer process using a blocked hydroxyl group transfer initiator (1-[2-trimethylsiloxyethoxy]-1-trimethylsiloxy-2-methyl propene) in the presence of tetrabutylammonium m-chlorobenzoate catalyst to a poly methyl methacrylate weight average molecular weight of between 2,000 and 35,000, and preferably between 4,000 and 20,000. Subsequent removal of the hydroxy protecting group followed by the addition of isocyanoethyl methacrylate affords a methacrylate terminal group in excellent yield. It is the methacrylate terminal group which copolymerizes with the alkyl acrylate comonomers. This preparation technique can provide an particularly narrow range of molecular weights, and is often preferred for accurate control of final product characteristics.

Other macromonomers which are often preferred for use in the present compositions are made by polymerizing methyl methacrylate under solution free radical conditions in the presence of bis[boron difloro dimethyl glyoximato] cobaltate [II] to a poly methyl methacrylate weight average molecular weight of between 2,000 and 35,000, and preferably between 4,000 and 20,000. Due to the special chain transfer characteristics of the cobalt additive, the poly methyl methacrylate chains are terminated with a single vinyl end group in excellent yield. Although the resulting vinyl terminal group is different than an acrylate or methacrylate group, it copolymerizes well with acrylate or methacrylate comonomers.

The backbone of the comb polymers used in the present invention can be prepared from alkyl methacrylate and acrylate comonomers in which the alkyl group contains from 1 to 18 carbon atoms. These include methyl acrylate, ethyl acrylate, propyl acrylate, isopropyl acrylate, the four butyl acrylates, amyl acrylates, the hexyl acrylates, the 2-ethylhexyl and other octyl acrylates, the nonyl acrylates and the decyl acrylates, lauryl acrylate, stearyl acrylate. Similar methacrylate analogs as well as lauryl methacrylate, stearyl methacrylate and octadecyl methacrylate may be selectively used at lower concentrations relative to the alkyl acrylate comonomers. Optionally, methacrylic acid, acrylic acid, acrylamide, hydroxyethyl acrylate, and glycidal acrylate can also be used.

Regardless of the comonomer mix, acrylic backbone Tg should be in the range of about from 0° to −80° C., and is incompatible with the macromonomer side chains. Preferred alkyl acrylate and methacrylate comonomers are the octyl acrylates in combination with higher alkyl analogs, which provide improved long term compatibility with the water white poly alicyclic tackifiers derived from completely hydrogenated poly(aromatic) copolymers. Preferred alkyl acrylate and methacrylate comonomers include 2-ethylhexyl acrylate in combination with either isodecyl acrylate, lauryl methacrylate or stearyl methacrylate.

The acrylic comb copolymers can be prepared by copolymerization of the macromonomer with one or more comonomers selected from the group of alkyl acrylates and high alkyl methacrylates and optionally acrylic acid, methacrylic acid, acrylamide by conventional free-radical copolymerization techniques. The preferred copolymers are prepared by copolymerization of about from 5 to 25% by weight, based on acrylic comb copolymer, of the macromonomer with about from 75 to 95% by weight, based on acrylic comb copolymer, of on or more alkyl acrylate comonomers, as taught in U.S. Pat. Nos. 3,786,116 and 4,554,324. As indicated, comonomers including 2-ethylhexyl acrylate and either isodecyl acrylate, lauryl methacrylate or stearyl methacrylate comprise the preferred acrylic backbone composition for compatibility considerations with high performance poly alicyclic tackifiers. A preferred copolymer consists of an acrylic backbone based primarily on 2-ethylhexyl acrylate with poly methyl methacrylate chains attached to the backbone. The copolymerization proceeds according to known relationships based on relative reactivities of the monomers derived from standard copolymerization kinetics. The temperature of copolymerization can vary from 30° to 150° C., depending on initiator type, for periods of about from 1 to 20 hours to achieve comonomer conversion greater than 95%.

Conventional solvents such as ethyl acetate, methyl ethyl ketone, and acetone can be used for the copolymerization step although a solvent is not required.

To achieve adequate adhesive properties, peak comb copolymer molecular weights should be between 70,000 and 600,000, and preferably between 100,000 and 300,000 as measured by Gel Permeation Chromatography using a HP 1090 chromatograph equipped with 4 Waters ultra styrogel columns ($10^6$A, $10^5$A, $10^4$A, $10^3$A) calibrated with polystyrene standards.

In the alternate, the graft or comb polymer can be prepared by conventional grafting techniques in which a low Tg acrylic polymer or copolymer is reacted to a higher Tg methacrylic polymer or copolymer using free radicals, or by the use of chemical reactions along the chains of each polymer.

The tackifier and plasticizer resins are added to the acrylic copolymers to improve the balance of hot melt pressure sensitive adhesive properties. Tackifiers for the present invention have ring and ball softening points in the range of about from 25° to 130° C. Plasticizers, by contrast, have ring and ball softening points below about 25° C.

Compounding of the acrylic copolymer is best accomplished by choosing an ingredient having selective compatibility with the acrylic backbone of the comb copolymer. Secondly, and equally as important for an acrylic adhesive, the ingredient should complement the water white color, stability and general durability features normally associated with acrylic polymers. While many classes of tackifiers and plasticizers can be used in this invention to significantly improve the balance of hot melt pressure sensitive properties, the selection of suitable compounding ingredients narrows substantially when also considering color, stability and durability properties. Preferred compounding ingredients include partially hydrogenated rosin esters and completely hydrogenated poly(aromatic) copolymers which can also be referred to as poly alicyclics. The latter poly alicyclic class is preferred because of complete or near complete hydrogenation combined with water white color. This contrasts partial hydrogenation and pale yellow color for current commercial hydrogenated rosin esters compounds.

The amount of tackifier used in the present compositions is about from 10 to 70% by weight based on total adhesive compound. A particularly preferred concentration of tackifier is about from 30 to 50% by weight, based on the total adhesive composition. Within this range, it has been found that a particularly beneficial combination of adhesive properties is realized. Specifically, the combination of tack, shear and viscosity of compositions within this range provides a particularly good balance of adhesive properties and processability. This is a function of unusual trends of properties for the present compositions. Specifically, it has been found that the tack of these compositions decreases while shear increases. In addition, shear increases as viscosity decreases. While it is not unusual for viscosity to decrease with increased concentrations of tackifier, it is unexpected to find increased shear adhesion while tack and viscosity are decreasing.

The overall effect of this preferred tackifier concentration range produces an optimum balance of tack, peel, shear and viscosity for many commercial applications. These trends are summarized in the Figure, which illustrates these characteristics for a typical resin system of the present invention.

Non-Newtonian rheological behavior is also observed for the present compositions, which contributes to the shear characteristics of the system.

Tackifiers which can be used in the present invention include commercially available hydrogenated rosin ester compounds such as those formed with pentaerythritol, glycerin and ethylene glycol. Stabilized rosin ester compounds based on similar alcohols can also be used but are likely to be less effective in maintaining stability and durability. Preferred commercially available poly alicyclic tackifiers include those initially based on aromatic copolymers of styrene, alpha-methyl styrene, and indene, followed by a hydrogenation process. These are characterized by water white color and high stability. Some preferred tackifiers have only short term compatibility with the acrylic backbone based on alkyl acrylate esters comonomers of around 8 carbons in length, and a judicious selection of higher alkyl comonomers is required to ensure long term compatibility and subsequent adhesive properties. For example, acrylic backbones based on 2-ethylhexyl acrylate and a longer chain acrylate or methacrylate including isodecyl acrylate, lauryl methacrylate and stearyl methacrylate have been found to ensure compatibility and prevent a deterioration of adhesive properties and clarity from phasing out of the tackifier.

Specific combinations of tackifiers have been found to provide unusually beneficial adhesive performance in the present invention. For example, adhesive compositions comprising about from 95 to 85%, by weight of the tackifier, of at least one hydrogenated poly(aromatic) copolymer, and, complementally, about from 5 to 15%, by weight of the tackifier, of at least one second tackifier compatible with the acrylic backbone of the comb polymer can result in a substantial improvement of tack, peel and shear, combined with decreased viscosity, compared to the unblended hydrogenated poly(aromatic) copolymer formulation. Such second tackfiers can include, for example, hydrogenated rosin ester compounds, mixed hydrocarbon tackifiers and non-hydrogentated polyaromatic tackifiers.

The plasticizer can be used in amounts of up to about 20% by weight, based on the total adhesive formulation. Preferred plasticizers which are readily available include adipate and glutarate esters, hydrogenated rosin esters and reduced alcohol derivatives. Particularly preferred plasticizers include hydrogenated poly (aromatic) copolymers and mineral or paraffin oils.

The use of tackifiers and plasticizers in the compositions of the present invention, in combination with high molecular weight acrylic comb copolymers allow melt viscosities below 200,000 cps at 177° C. to be obtained. This makes the adhesive compositions suitable for use on conventional hot melt coating equipment. Due to the highly branched nature, acrylic comb copolymers and compounded comb copolymers are non-Newtonian and exhibit shear thinning characteristics. As a result, melt viscosity data is supplied from a Rheometrics Mechanical Spectrometer 800 using parallel plates at 10 sec−1 and 100 sec−1 for both acrylic comb polymers and compounds. The higher shear rate of 100 sec−1 is regarded to be below the operational shear rates typically encountered in high speed hot melt coating.

The acrylic comb copolymer compounds prepared in accordance with the present invention are easily coated upon suitable flexible backing materials by conventional coating techniques to produce coated sheet materials. The adhesive compounds of the present invention can be applied to the flexible backing material as a solution and the solvent subsequently removed to leave a tacky coating on the backing material. However, the preferred adhesives can be applied from the melt directly to the backing allowing a single step coating operation.

Flexible backing material may be any material conventionally used as tape backing or any other flexible backing Flexible backings which can be used for the present adhesive compositions include paper and thermoplastic films of polymers such as polyethylene, polypropylene, polyvinyl chloride, polyesters (i.e. polyethylene terephthalate), cellulose acetate and ethyl cellulose. Backings may also be prepared of silicon release liner, cloth, fabric, metal, metalized polymer films or ceramic sheet materials. The coated sheet materials may take the form of any article conventionally known to be used with pressure sensitive adhesive compositions, such as tapes, labels, decals, protective coverings, trim mountings, medical bandages and the like.

In light of U.S. Pat. No. 4,656,213 it is surprising that an all acrylic comb copolymer will be markedly improved by the addition of tackifier since it was previously believed that it was essential to have poly(vinyl aromatic monomer) macromonomer as the side chain. It is further surprising that an all acrylic comb polymer with very poor initial pressure sensitive adhesive properties can also be markedly improved by the addition of tackifier.

In the following Example, which further illustrates the invention, the following test and evaluation procedures are used.

PRESSURE SENSITIVE ADHESIVE TESTING

The acrylic copolymers obtained were solution coated onto 2 mil Mylar film to give an adhesive dry coating thickness of 1.0 mil. Additionally, the acrylic copolymers were solution compounded with tackifiers and plasticizers as indicated by adding the formulating ingredient to an aliquot of the copolymer syrup and adding sufficient toluene to achieve a final solids content of 40 wt %. The resulting compound solutions were mixed for a period of 18 hours prior to solution coating onto 2.0 mil Mylar film to give an adhesive dry coating thickness of 1.0 mil.

Hot melt compounding was performed using 100% solids acrylic copolymer obtained by devolatilizing the copolymer syrup in a vacuum oven at 40° C. for a period of 48 hours. Compounding was performed as indicated by adding the tackifier to the molten acrylic copolymer at 177° C. in a Brabender mixer over a period of 15 minutes followed by an additional 30 minutes mixing at 177° C. and 100 rpm. The resulting acrylic adhesive compound was hot melt coated at 177° C. onto 2.0 mil oriented polyethylene terephthalate film to a adhesive coating thickness of 1.0 mil using a laboratory Accumeter hot melt coater.

Acrylic adhesive coated flexible sheet materials were cut into smaller strips and tested according to Pressure Sensitive Tape Council and ASTM procedures as follows.

Tack was determined using a Polyken Probe Tack Tester according to ASTM D2979 using a probe speed of 1 cm/sec and a dwell time of 1 second. Tack is reported in grams.

Peel Adhesion was determined according to PSTC No.1 for 180 degree peel. The substrate was stainless steel. Peel is reported in oz/in.

Shear adhesion was measured using a stainless steel substrate according to P STC No.7 utilizing a $\frac{1}{2}''\times\frac{1}{2}''$ contact area and 1 Kg load. Shear adhesion is reported in minutes to failure.

Melt viscosity at 177 C was measured using a Rheometrics Mechanical Spectrometer-800 equipped with parallel plates. Melt viscosity is reported in cps at 10 sec-1 and (100 sec-1) shear rates.

EXAMPLES 1-3 AND CONTROL EXAMPLE A

A. Preparation of a Methacrylate Terminated Poly Methyl Methacrylate Macromonomer via Group Transfer Polymerization and Capping with 2-Isocyanoethyl Methacrylate A 5 liter flask equipped with thermometer, reflux condenser, N2 inlet, mechanical stirrer, and addition funnels was charged with 895.2 gm of toluene, 49.45 gm of 1-(2-trimethylsiloxyethoxy)-1-trimethylsiloxy-2-methyl propene, .0179 M, and 3.12 ml of a 1.0 M solution of tetrabutylammonium m-chlorobenzoate dissolved in acetonitrile. Feed I, 1796.8 gm of methyl methacrylate, was added over 35 minutes beginning at room temperature. Feed II, 4.5 ml of 1.0 M tetrabutylammonium M-chlorobenzoate and 14.9 gm of glyme, was begun simultaneously with Feed I. Feed II was added over 60 minutes. At 102 minutes, 20 gm of methanol was added to quench the reaction. The polymer formed was at 61.7% solids (99% conversion). To the polymer solution was added 34.0 gm of water and 102.17 gm of iso-propanol. The polymer solution was then refluxed for 5 hours. The IR spectra of some dried polymer showed a band at 3550 cm($-1$) that corresponds to an OH band.

Toluene, 300 ml was then added and the polymer solution was then distilled until the vapor temperature reached 105 C. A total of 484.0 gm of material was distilled off. This removed all excess water and alcohols. An Ir spectrum showed the band at 550 cm($-1$) still present.

To the polymer solution was added 27.7 gm of a 1% solution of dibutyltin dilaurate in methyl ethyl ketone and 55.54 gm of 2-isocyanoethyl methacrylate, 0.036 M. An IR spectrum showed no OH band at 35550 cm ($-1$) but a small NCO band at 2265 cm($-1$) a small OH band (from the methanol) at 3550 cm($-1$), and a carbon-carbon double bond (from the methacrylate functionality) at 1640 cm($-1$). GPC analysis of the final product indicated the macromonomer had a $Mn=11,000$ (theo. $Mn=10,000$), $Mw=14,000$, $MWD=1.27$, based on polystyrene standards.

B. Preparation of Poly Methyl Methacrylate/Acrylic Acid/2-Ethylhexyl Acrylic Comb Copolymer A 1 liter flask equipped with thermometer, reflux condenser, N2 inlet, mechanical stirrer, and addition funnel was charged with 200.00 gm of ethyl acetate, 65.64 gm of 2-ethylhexyl acrylate, 10.94 gm of the poly methyl methacrylate macromonomer from Section A above, 1.56 gm acrylic acid and .07 gm Vazo 64 initiator. The reaction mixture was heated to 70 C over a period of 30 minutes and held for at 70 C for an additional 15 minutes. Feed II, 100 gm of ethyl acetate, 98.45 gm 2-ethylhexyl acrylate, 16.4 gm of the macromonomer from Section A above, 2.35 gm of acrylic acid, and .11 gm of Vazo 64 initiator was added over a period of 140 minutes. The mixture was allowed to react for an additional 150 minutes at 70 C prior to a 1 hour reflux. The acrylic copolymer solution had a total solids content of 39.0% (theoretical 39.45%). Characterization of the final product indicated that the copolymer had an apparent GPC peak molecular weight of 185,000 and 14% by weight macromonomer, 2% by weight acrylic acid and 84% by weight 2-ethylhexyl acrylate.

This comb copolymer is designated Control Example A, and was tested according to the procedures outlined above. The results are reported in Table I.

C. Solution Compounding of Poly Methyl Methacrylate/Acrylic Comb Copolymers with Tackifiers and Plasticizers In Examples 1 and 2, the comb copolymer prepared in Section B above was respectively compounded with a rosin ester tackifier (commercially available as Super Ester W-100 tackifier from Arakawa Chemical company) and a hydrogenated rosin ester tackifier (commercially available as Foral 105 tackifier from Hercules), in the amounts indicated in Table I.

The compounded adhesives were tested, and the results are shown in Table I. Both the unmodified and compounded copolymers were tested as 1.0 mil solution cast films on 2.0 mil biaxially oriented polyethylene terephthalate film, and the results are summarized in Table I. The results indicate the significant improvement in the balance of adhesive properties and melt viscosity following compounding with commercially available ingredients.

EXAMPLES 3-7 AND CONTROL EXAMPLE B

A. Preparation of Poly Methyl Methacrylate/ 2-Ethylhexyl Acrylate Comb Copolymer A 1 liter flask equipped with thermometer, reflux condenser, N2 inlet, mechanical stirrer, and addition funnel was charged with 200.00 gm ethyl acetate, 68.00 gm of 2-ethylhexyl acrylate, 10.94 gm of the poly methyl methacrylate macromonomer prepared in Section A of Examples 1-2 above, together with 0.07 gm of Vazo 64 initiator. The reaction mixture was heated to 70° C. over a period of 30 minutes and held at 70° C. for an additional 15 minutes. Feed II, 100.00 gm of ethyl acetate, 100 gm of 2-ethylhexyl acrylate, 16.41 gm of the same poly methyl methacrylate macromonomer and .11 gm of Vazo 64 initiator was added over a period of 140 minutes. The mixture was allowed to react for an additional 150 minutes at 70 C prior to a 1 hour reflux. The acrylic copolymer solution had a total solids content of 39.1% (theoretical 39.45%). Characterization of the final product indicated that the comb copolymer had an apparent GPC peak molecular weight of 180,000 and 14% by weight macromonomer and 86% by weight 2-ethylhexyl acrylate.

This comb copolymer is designated Control Example B, and was tested according to the procedures outlined above. The results are reported in Table I.

B. Solution Compounding of Acrylic Comb Copolymer with Tackifiers and Plasticizers In Examples 3-7, the comb copolymer prepared in Section A above was respectively compounded, in the amounts indicated in Table I, with hydrogenated rosin ester tackifier (commercially available as Foral 105 from Hercules, Inc.); with hydrocarbon resin tackifier (commercially available as Super Sta Tac 100 from Reichold); with hydrogenated aromatic copolymer tackifier (commercially available as Regalrez 1078 tackifier from Hercules, Inc.); with a combination of Regalrez 1078 and another hydrogenated aromatic copolymer plasticizer (commercially available as Regalrez 1018 plasticizer from Hercules, Inc.); and with a combination of Super Sta Tac 100 tackifier and a hydrocarbon resin plasticizer (commercially available from Goodyear as Wingtac 10 plasticizer); each in the amounts indicated in Table I.

The compounded adhesives were tested as in Example 1 and 2, and the results are shown in Table I. The results again indicate the significant improvement in the balance of adhesive properties and melt viscosity following compounding with commercially available ingredients.

EXAMPLES 8-11 AND CONTROL EXAMPLE C

A. Preparation of Poly Methyl Methacrylate/Stearyl Methacrylate/2-Ethylhexyl Acrylate Comb Copolymer A 1 liter flask equipped with thermometer, reflux condenser, N2 inlet, mechanical stirrer, and addition funnel was charged with 200.00 gm ethyl acetate, 54.55 gm of 2-ethylhexyl acrylate, 13.45 gm of stearyl methacrylate, 10.94 gm of the poly methyl methacrylate macromonomer from Section A of Examples 1-2 and .07 gm of Vazo 64 initiator. The reaction mixture was heated to 70 C over a period of 30 minutes and held at 70 C for an additional 15 minutes. Feed II, 100 gm of ethyl acetate, 79.85 gm of 2-ethylhexyl acrylate, 20.15 gm of stearyl methacrylate, 16.41 gm of the same poly methyl methacrylate macromonomer and .11 gm Vazo 64 initiator was added over a period of 140 minutes. The mixture was allowed to react for an additional 150 minutes at 70° C. prior to a 2 hour reflux. The acrylic copolymer solution had a total solids content of 39.2% (theoretical 39.45%). Characterization of the final product indicated that the resulting comb copolymer had an apparent GPC peak molecular weight of 130,000 and 14% by weight macromonomer, 17.2% by weight stearyl methacrylate and 68.8% by weight 2-ethylhexyl acrylate.

The resulting comb polymer was designated Control Example C and tested as before.

B. Compounding of Comb Polymer

In Examples 8-11, the comb polymer prepared in Section A above was compounded with the types and quantities of tackifiers indicated in Table II. The tackifiers used in Examples 10 and 11 were hydrogenated aromatic copolymers commercially available from Arakawa Chemical Company. The adhesive compositions were tested as before, and the results reported in Table II.

EXAMPLES 12-14 AND CONTROL EXAMPLE D

A. Preparation of Poly Methyl Methacrylate/Lauryl Methacrylate/2-Ethylhexyl Acrylate Comb Copolymer Using the general reaction method of Example 8-11 above, a copolymer was prepared from 14% by weight poly methyl methacrylate macromonomer from Section A of Examples 1-2, 17.2% by weight lauryl methacrylate, and 68.8% 2-ethylhexyl acrylate to afford a final product having an apparent GPC peak molecular weight of 133,000. The resulting comb polymer was designated Control Example D.

B. Compounding of Comb Polymer

In Examples 12-14, the comb polymer prepared in Section A above was compounded with the types and quantities of tackifiers indicated in Table II. The adhesive compositions were tested as before, and the results reported in Table II. The results demonstrate that the acrylic backbone can be tailored by judicious selection of comonomers including methacrylates to afford long term compatibility and allow compounding with a variety of high performance hydrogenated tackifiers. The use of premium tackifiers not only improves the balance of hot melt pressure sensitive adhesive properties but also ensures long term color stability, weatherability and general durability of the formulations.

EXAMPLES 15-16

A. Preparation of a Vinyl Terminated Poly Methyl Methacrylate Macromonomer via Polymerization and Cobalt Chain Transfer Agent A 5 liter flask equipped with thermometer, reflux condenser, N2 inlet, mechanical stirrer, and addition funnels was charged with 193.5 gm of ethyl acetate, 828.0 gm of methyl methacrylate and .01 gm of bis[boron difloro dimethyl glyoximato] colbaltate [II]. Feed I, 22.5 gm of ethyl acetate and .031 gm of Vazo 67 initiator was added to the reaction flask at reflux temperature over a period of 10 minutes. Feed II, 1242.8 gm of methyl methacrylate was added following completion of feed I at an initial rate of 9.44 gm/min. for 2 hours and a subsequently at a final rate of .92 gm/min. for 2 additional hours. Feed III, 450 gm of ethyl acetate and 2.62 gm of Vazo 67 initiator was begun with feed II and added uniformly over a period of 4 hours. Feed IV, 365.0 gm of ethyl acetate and 2.06 gm of of Vazo 67 was added following completion of feeds II & III over a period of 1.5 hours. Following addition of feed IV, the reaction mixture was refluxed for and additional 2 hours. Feed V, 900.3 gm of ethyl acetate was added over 15 minutes to reduce solution viscosity and solids content. The resulting macromonomer solution had a total solids content of 51.0% (theoretical 51.8). GPC analysis of the final product indicated that the macromonomer had a Mn =7,000, Mw=12,000, MWD=1.71 based on polystyrene standards. Thermal gravimetric analysis (TGA) was used according to the procedures set forth in Cacioli et al., Polymer Bulletin, 11, 325–328 (1984) to determine the percentage of unsaturated or vinyl end groups in the final reaction mixture. The macromonomer was determined to be 95% vinyl terminated or functional by this characterization procedure.

B. Preparation of Poly Methyl Methacrylate/2-Ethylhexyl Acrylate Comb Copolymer for Hot Melt Compounding and Coating A 5 liter flask equipped with thermometer reflux condenser, N2 inlet, mechanical stirrer, and addition funnels was charged with 1000 gm of ethyl acetate, 339.75 gm of 2-ethylhexyl acrylate, 54.7 gm of the poly methyl methacrylate macromonomer from Section A above, and .35 gm of Vazo 64 initiator. The reaction mixture was heated slowly to 65° C. over a period of 40 minutes and held at 65° C. for an additional 20 minutes. Feed II, 500 gm of ethyl acetate, 500 gm of 2-ethylhexyl acrylate, 82.10 gm of the same poly methyl methacrylate macromonomer and .55 gm of Vazo 64 initiator was added over a period of 210 minutes. The mixture was allowed to react for an additional 120 minutes at 65° C. prior to a 2 hour reflux. The resulting acrylic comb copolymer solution had a total solids content of 39.0% (theoretical 39.45%). Characterization of the final product indicated that the copolymer had an apparent GPC peak molecular weight of 144,000 and 14% by weight macromonomer and 86% by weight 2-ethylhexyl acrylate.

C. Hot Melt Compounding and Coating

The comb copolymer solution prepared in Section B above was stabilized with 1.0 phr Agerite Geltrol antioxidant and vacuum dried for 48 hours at 40° C. In Examples 15 and 16, the resulting 100% solids copolymer was hot melt compounded respectively with the tackifiers and in the quantities specified in Table III. The copolymers were compounded in a Brabender mixer at 177° C. The resulting acrylic adhesive compositions were hot melt applied to biaxially oriented polyethylene terephthalate film at the rate of 10 ft/min. using a laboratory hot melt coater. Adhesive properties obtained on the hot melt coated tapes are shown in Table III. These results show that the two acrylic adhesive compounds have an attractive balance of properties suitable for hot melt pressure sensitive adhesive applications.

EXAMPLES 17-20

The general procedure of Examples 15-16 was repeated, except that the levels of cobalt additive and initiator were initially adjusted to provide a macromonomer having a molecular weight of Mn=5,000, Mw=9,000 and MWD=1.80 based on polystyrene standards. Due to the slightly lower macromonomer molecular weight and higher macromonomer level, the copolymer had an apparent GPC peak molecular weight of 115,000 and 14.5% by weight macromonomer and 85.5% by weight 2-ethyl hexyl acrylate. The resulting comb copolymer was respectively compounded, in the amounts listed in Table IV, with a hydrogenated aromatic copolymer tackifier (Regalrez 1078), a hydrogenated rosin ester (commercially available as KE-311 from Arakawa Chemical Company) and blends of hydrogenated rosin ester and polyaromatic copolymer. The compounded adhesives were tested as 1.0 mil solution cast films on 2.0 mil biaxially oriented polyethylene terephthalate film and the results summarized in Table IV. The resulting adhesive compositions were tested, and those compositions using a blend of tackifiers were found to exhibit markedly improved adhesive properties, also as shown in the Table IV.

TABLE I

| EXAMPLE | COPOLYMER | TACKIFIER (phr) | TACK gm | PEEL oz/in | SHEAR min | MELT VISCOSITY @ 177° C. CPS × $10^{-3}$ |
|---|---|---|---|---|---|---|
| Control A | PMMA/AA/EHA | — | 700 | 35 | 57 | 961 (143) |
| 1 | " | SUPER ESTER W-100 (77) | 500 | 91 | 324 | 10 (5) |
| 2 | " | FORAL 105 (77) | 550 | 89 | 1147 | 80 (19) |
| Control B | PMMA/EHA | — | 600 | 12 | 7 | 843 (123) |
| 3 | " | FORAL 105 (80) | 700 | 95 | 405 | 56 (16) |
| 4 | " | SUPER STA TAC | 650 | 99 | 680 | 170 (30) |
| 5 | " | REGALREZ 1078 (80) | 750 | 87 | 505 | 192 (29) |
| 6 | " | REGALREZ 1078 (80) REGALREZ 1018 (10) | 1250 | 85 | 244 | 174 (26) |
| 7 | " | SUPER STA TAC 100 (80) WINGTAC 10 (10) | 550 | 90 | 360 | 140 (25) |

TABLE II

| EXAMPLE | COPOLYMER | TACKIFIER (phr) | TACK gm | PEEL oz/in | SHEAR min | MELT VISCOSITY @ 177° C. CPS × $10^{-3}$ |
|---|---|---|---|---|---|---|
| Control C | PMMA/SM/EHA | — | 600 | 6 | 4 | 546 (80) |
| 8 | " | FORAL 105 (80) | 1100 | 92 | 165 | 25 (8) |
| 9 | " | REGALREZ 1078 (80) | 1200 | 81 | 210 | 100 (17) |
| 10 | " | ARKON M-100 (73) | 550 | 87 | 312 | 117 (21) |
| 11 | " | ARKON P-100 (73) | 600 | 91 | 410 | 129 (22) |
| Control D | PMMA/LM/EHA | — | 650 | 12 | 4 | 425 (67) |
| 12 | " | FORAL 105 (80) | 1100 | 88 | 154 | 24 (8) |
| 13 | " | REGALREZ 1078 (80) | 1150 | 90 | 180 | 103 (18) |
| 14 | " | ARKON M-100 (73) | 700 | 95 | 220 | 100 (20) |

TABLE III

| EXAMPLE | COPOLYMER | TACKIFIER (phr) | TACK gm | PEEL oz/in | SHEAR min | MELT VISCOSITY @ 177° C. CPS × $10^{-3}$ |
|---|---|---|---|---|---|---|
| 15 | PMMA/EHA | REGALREZ 1078 (85) | 550 | 94 | 1187 | 168 (34) |
| 16 | PMMA/EHA | FORAL 105 (80) | 450 | 95 | 2040 | 11 (5) |

TABLE IV

| Example | Copolymer | Tackifier (PhR) | Tack gm | Peel oz/in. | Shear min. | Melt Viscosity @ 177° C. CPS × $10^{-3}$ |
|---|---|---|---|---|---|---|
| 17 | PMMA/EHA | Regalrez 1078 (85) | 650 | 94 | 960 | 90 (24) |
| 18 | PMMA/EHA | Regalrez 1078 (80) KE-311 (5) | 1050 | 100 | 1760 | 65 (19)* |
| 19 | PMMA/EHA | Regalrez 1078 (75) KE-311 (10) | 1450 | 101 | 3200 | 41 (15) |
| 20 | PMMA/EHA | KE-311 (90) | 550 | 104 | 820 | 3 (2) |

*estimated

I claim:

1. An acrylic hot melt pressure sensitive adhesive composition comprising
   (a) 30 to 90% by weight of a thermoplastic comb copolymer of
      (i) 2-35% by weight, based on the thermoplastic copolymer, of a macromonomer of the general formula X-(Y)n-Z wherein X is a reactive end group capable of copolymerization under free radical conditions with acrylic comonomers to afford the comb copolymer having pendant macromonomer side chains along an acrylic backbone; Y is a linking group in which n is zero or one; and Z is a poly(methacrylate) based a polymeric moiety having a $T_g$ greater than 20° C. and a weight average molecular weight of about from 2,000 to 35,000 and being substantially unreactive under copolymerization conditions; and (ii) 65 to 98% by weight, based on the thermoplastic copolymer, of one or more monomers selected from the group consisting of monomeric acrylic or methacrylic acid ester of a non-tertiary alcohol, the alcohol having from 1 to 18 carbon atoms;

(b) about from 10 to 70% by weight of tackifier; and (c) about from 0 to 20% by weight of plasticizer.

2. An acrylic hot melt pressure sensitive adhesive composition of claim 1 wherein component (a) (ii) further comprises up to about 10% of at least one monomer selected from methacrylic acid, acrylic acid, acrylamide, methacrylamide, glycidyl methacrylate and hydroxyethyl acrylate.

3. An acrylic hot melt pressure sensitive adhesive composition of claim 1 wherein the molecular weight of the micromonomer (a) (i) is about from 4,000 to 20,000.

4. An acrylic hot melt pressure sensitive adhesive composition of claim 1 wherein the macromonomer consists essentially of poly methyl methacrylate.

5. An acrylic hot melt pressure sensitive adhesive composition of claim 1 wherein the comb copolymer comprises about from 5 to 25% macromonomer and about from 95 to 75% acrylic or methacrylic acid ester comonomer.

6. An acrylic hot melt pressure sensitive adhesive composition of claim 1 wherein component (a) (ii) comprises at least one of 2-ethylhexyl acrylate and isooctyl acrylate.

7. An acrylic hot melt pressure sensitive adhesive composition of claim 6 wherein component (a) (ii) further comprises about from 1 to 40% of at least one monomer selected from lauryl methacrylate, stearyl methacrylate, and isodecyl acrylate.

8. An acrylic hot melt pressure sensitive adhesive composition of claim 1 wherein the comb polymer has an apparent peak molecular weight of about from 70,000 to 600,000.

9. An acrylic hot melt pressure sensitive adhesive composition of claim 8 wherein the comb polymer has an apparent peak molecular weight of about from 100,000 to 300,000.

10. An acrylic hot melt pressure sensitive adhesive composition of claim 1 wherein the concentration of tackifier is about from 30 to 50% by weight, based on the total adhesive composition.

11. An acrylic hot melt pressure sensitive adhesive composition of claim 1 wherein the tackifier is selected from hydrogenated rosin esters and hydrogenated poly(aromatic) copolymers.

12. An acrylic hot melt pressure sensitive adhesive composition of claim 11 wherein the tackifier consists essentially of hydrogenated rosin ester formed with pentaerythritol.

13. An acrylic hot melt pressure sensitive adhesive composition of claim 11 wherein the tackifier consists essentially of hydrogenated rosin ester formed with glycerine.

14. An acrylic hot melt pressure sensitive adhesive composition of claim 1 wherein the plasticizer is selected from adipate and glutarate esters, hydrogenated rosin esters, reduced alcohol derivatives, hydrogenated poly (aromatic) copolymers, mineral oils and paraffin oils.

15. Pressure sensitive adhesive coated sheet material comprising a flexible backing having a coating of an acrylic hot melt pressure sensitive adhesive composition of claim 1.

16. An adhesive composition of claim 1 wherein the thermoplastic comb copolymer (a) in the absence of said tackifier and plasticizer has a shear adhesion in minutes to failure of less than 50 and said adhesive composition with tackifier (b) and any plasticizer (c) has a shear adhesion in minutes to failure of greater than 150.

17. An adhesive composition of claim 16 having a shear adhesion in minutes to failure of greater than 50.

18. An adhesive composition of claim 16 wherein the comb copolymer (a) without tackifier and plasticizer has a shear adhesion of less than 10 and with tackifier and any plasticizer of greater than 150.

* * * * *

UNITED STATES PATENT AND TRADEMARK OFFICE
CERTIFICATE OF CORRECTION

PATENT NO. : 5,225,470
DATED : July 6, 1993
INVENTOR(S) : Mancinelli

It is certified that error appears in the above-identified patent and that said Letters Patent is hereby corrected as shown below:

Title page, item [73] Assignee: the word "Monssanto" should read, instead, Monsanto.

Signed and Sealed this

First Day of February, 1994

Attest:

BRUCE LEHMAN

Attesting Officer

Commissioner of Patents and Trademarks